(12) United States Patent
Furuki et al.

(10) Patent No.: US 6,714,403 B2
(45) Date of Patent: Mar. 30, 2004

(54) FOLDABLE KEYBOARD INPUT DEVICE

(75) Inventors: Shigeru Furuki, Fukushima-ken (JP); Kazutoshi Watanabe, Fukushima-ken (JP); Takahiro Kawauchi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 19 days.

(21) Appl. No.: 10/054,218

(22) Filed: Nov. 13, 2001

(65) Prior Publication Data

US 2002/0066651 A1 Jun. 6, 2002

(30) Foreign Application Priority Data

Nov. 22, 2000 (JP) .......................................... 2000-356180

(51) Int. Cl.[7] .................................................. G06F 1/16
(52) U.S. Cl. ........................ 361/680; 345/168; 400/682; D14/393
(58) Field of Search ........................ 361/680; 345/168; 400/682; D14/393

(56) References Cited

U.S. PATENT DOCUMENTS

| | | | |
|---|---|---|---|
| 5,457,453 A | * | 10/1995 | Chiu et al. ..................... 341/22 |
| 5,574,481 A | * | 11/1996 | Lee .............................. 345/168 |
| 5,653,543 A | * | 8/1997 | Abe ............................. 400/489 |
| 5,712,760 A | | 1/1998 | Coulon et al. |
| 5,943,041 A | * | 8/1999 | Allison et al. ............... 345/168 |

FOREIGN PATENT DOCUMENTS

JP  Hei 7-93069  4/1995

* cited by examiner

*Primary Examiner*—Darren Schuberg
*Assistant Examiner*—Anthony Q. Edwards
(74) *Attorney, Agent, or Firm*—Brinks Hofer Gilson & Lione

(57) ABSTRACT

An object of the present invention is to provide a keyboard input device that has a key arrangement similar as an ordinary keyboard, and that can securely protects key tops when folding. The present invention is characterized as follows. A keyboard unit is divided into a first keyboard unit and a second keyboard unit so as to be foldable, the first keyboard unit is pivotably supported by the second keyboard unit so as to pivot about a position slightly inside from an end of a coupling side of the second keyboard unit, a cover for covering an area from the end of the coupling side of the second keyboard unit when the first keyboard unit and the second keyboard unit are superimposed is slidably attached to the first keyboard unit, and an end plate for covering the end of the coupling side of the second keyboard unit and the first keyboard unit when the first keyboard unit and the second keyboard unit are superimposed is pivotably coupled between the cover and the second keyboard unit.

3 Claims, 15 Drawing Sheets

FOLDABLE KEYBOARD INPUT DEVICE

BACKGROUND OF THE INVENTION

1. Field of Invention

The present invention relates to a keyboard input device for use of, e.g. a portable personal computer, a portable information terminal, and auxiliary input equipment thereof, and in particular, a foldable keyboard input device having a keyboard unit divided into a first keyboard unit and a second keyboard unit.

2. Description of the Prior Art

In recent years, in order to downsize a keyboard input device for connecting to a portable personal computer, a new keyboard input device has been proposed. That is, as shown in FIG. 31, a keyboard unit 100 is divided into a right hand side board 101 and a left hand side board 102, which are connected by a hinge 103 for keyboard so as to allow pivotal rotation and to make the right hand side board 101 and the left hand side board 102 foldable. Reference numeral 104 denotes a display panel.

By dividing the keyboard unit 100 to the right hand side board 101 and the left hand side board 102 and by making them foldable, it is possible to obtain convenience of portability and to save space, but it does not necessarily mean that there is no problem.

Specifically, the keyboard hinge 103 is provided at a connecting portion of the right hand side board 101 and the left hand side board 102 for folding. Thus, as shown in FIG. 31, the keyboard arrangement is separated into the right side and the left side so as to produce a space therebetween at the center, thus causing an uncomfortable feeling when the keyboard is used.

Moreover, the right hand side board 101 and the left hand side board 102 are superimposed when they are folded. Thus, it becomes necessary to place a top surface of each key top 105 lower than a top surface of a casing 106. Consequently, there is a problem of undesirable key operability.

SUMMARY OF THE INVENTION

The present invention is to solve the prior art drawbacks, and a first object thereof is to provide a keyboard input device that has a similar key arrangement as an ordinary keyboard, thus eliminating uncomfortable feeling when it is used and that secures protection of the key top when folding.

A second object of the present invention is to provide a keyboard input device, in which the top surface of the key top is projected more than the casing at the time of keyboard entry so as not to impair the key operability, and the top surface of the key top is lower than the top surface of the casing at the time of folding so as not to cause any trouble.

In order to achieve the first object, a keyboard input device of a folding type having a keyboard unit divided into a first keyboard unit and a second keyboard unit is characterized in that the first keyboard unit is pivotably supported by the second keyboard unit so as to pivot about a position slightly inside from an end of a coupling side of the second keyboard unit as its axis, a cover for covering an area from the end of the coupling side of the second keyboard unit to the axis when the first keyboard unit and the second keyboard unit are superimposed is slidably attached to the first keyboard unit, and an end plate for covering the end of the coupling side of the second keyboard unit and the first keyboard unit when the first keyboard unit and the second keyboard unit are superimposed is pivotably coupled between the cover and the second keyboard unit.

In order to achieve the second object, a keyboard input device of a folding type having a keyboard unit divided into a first keyboard unit and a second keyboard unit is characterized in that at least one of the first keyboard unit and the second keyboard unit is movable relative to a casing composed, for example, of a cover to be described later, key tops provided to the keyboard unit are projected from the casing when the keyboard unit are opened, and the key tops provided to the keyboard unit is housed in the casing when the keyboard unit is closed.

A third invention is a keyboard input device of a folding type having a keyboard unit divided into a first keyboard unit and a second keyboard unit characterized in that a first keyboard unit substrate such as a first keyboard unit membrane switch having each switching element provided so as to correspond to each key top disposed to the first keyboard unit and a second keyboard unit substrate such as a second keyboard unit membrane switch having each switching element provided so as to correspond to each key top disposed to the second keyboard unit are coupled by a coupling, when the first keyboard unit and the second keyboard unit are horizontal open, the coupling is bent in a wave shape adjacent to a joint of the first keyboard unit and the second keyboard unit, and when the first keyboard unit and the second keyboard unit are folded, the coupling is bent into a U-shape adjacent to a joint of the first keyboard unit and the second keyboard unit.

A fourth invention is a keyboard input device of a folding type having a keyboard unit divided into a first keyboard unit and a second keyboard unit characterized in that the first keyboard unit is pivotably supported by the second keyboard unit so as to pivot about a position slightly inside from an end of a coupling side of the second keyboard unit as its axis, a cover for covering an area from the end of the coupling side of the second keyboard unit to the axis when the first keyboard unit and the second keyboard unit are superimposed is slidably attached to the first keyboard unit, a projection provided to the cover is inserted into a guide groove formed to the first keyboard unit, a convex portion overriding the projection immediately before the first keyboard unit and the second keyboard unit move into a horizontal state and a projection housing where the projection fits into when the first keyboard unit and the second keyboard unit are in a horizontal state is provided next to each other along the guide groove.

A fifth invention is a keyboard input device of a folding type having a keyboard unit divided into a first keyboard unit and a second keyboard unit characterized in that a concave portion or a convex portion is provided adjacent to a coupling of the first keyboard unit to the second keyboard unit while a convex portion or a concave portion is provided adjacent to a coupling of the second keyboard unit to the first keyboard unit, and the concave portion overrides the convex portion immediately before the first keyboard unit and the second keyboard unit move into a horizontal state, and the concave portion and the convex portion are fitted together when the first keyboard unit and the second keyboard unit are in a horizontal state.

A sixth invention is a keyboard input device of a folding type having a keyboard unit divided into a first keyboard unit and a second keyboard unit characterized in that the first keyboard unit is pivotably supported by the second keyboard unit so as to pivot about a position slightly inside from an end of a coupling side of the second keyboard unit as its axis, a cover for covering an area from the end of the coupling side of the second keyboard unit to the axis when the first keyboard unit and the second keyboard unit are superimposed is provided, the cover is slidably supported by the first keyboard unit by inserting a projection provided to the cover into a guide groove formed to the first keyboard unit, and the projection has an angle controller for controlling an angle of the cover with respect to the first keyboard unit.

BRIEF DESCRIPTION OF THE DRAWINGS

DETAILED DESCRIPTION OF PREFERRED EMBODIMENT hereinbelow, embodiments of the present invention will be described with reference to appended drawings. FIGS. 1 to 5 are diagrams showing a first embodiment of the present invention. FIG. 1 is a front view of a keyboard input device being closed, FIGS. 2 and 3 are front views each showing a keyboard input device being opened, FIG. 4 is a front view showing a keyboard input device in its opened state.

Figure 5:
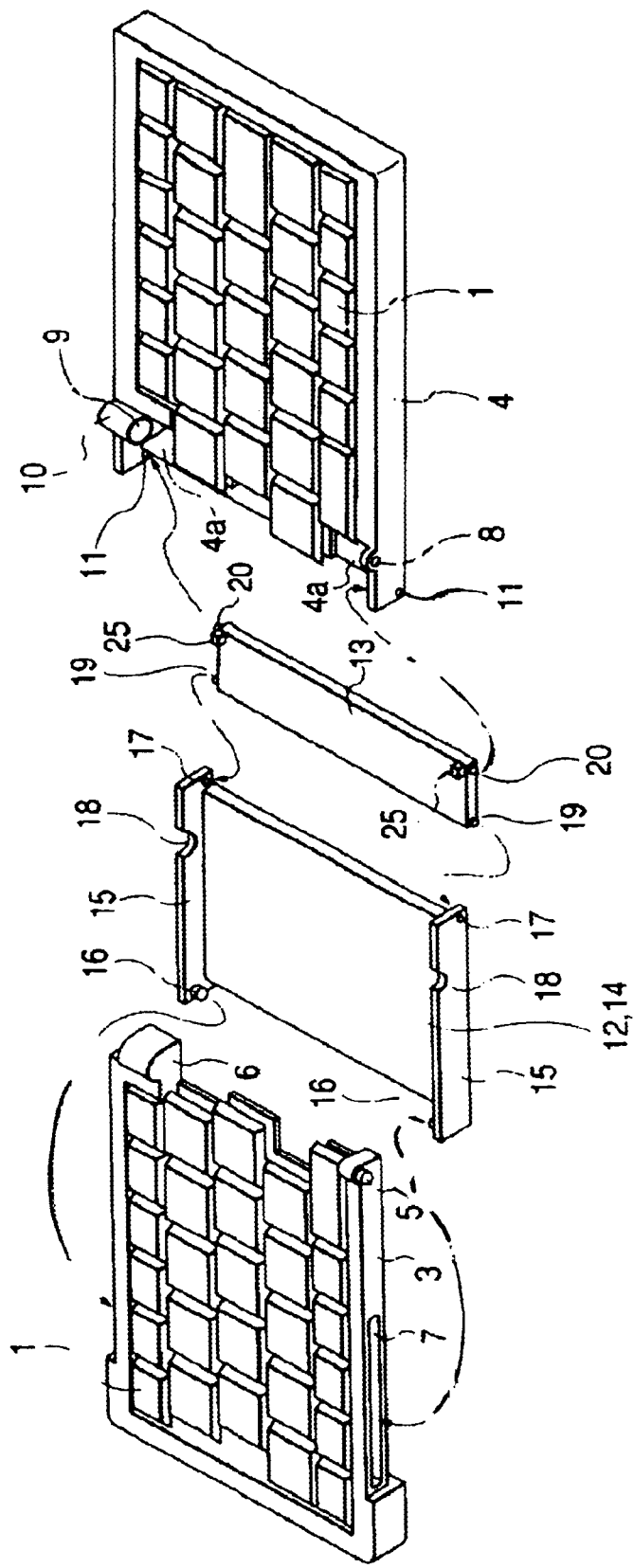
FIG. 5 is an exploded perspective view of a keyboard input device.

A keyboard input device connected to an information processing device (not shown) such as a personal computer is provided with a keyboard unit 2 having many key tops 1 (see FIG. 5). The keyboard unit 2 is divided into a first keyboard unit 3 and a second keyboard unit 4 each having substantially the same dimension and being foldably coupled to each other.

On both sides of the first keyboard unit 3 which is to be coupled with the second keyboard unit 4, a pivotal point pin 5 projecting outwardly and a pivotal point portion 6 (see FIG. 5) having a bottomed pin hole (not shown) are provided. On an opposite side of the pivotal point pin 5 and the pivotal point portion 6 on both sides of the first keyboard unit 3, a bottomed guide groove 7 extending linearly is formed.

At a position slightly toward outer side on both surfaces of the second keyboard unit 4 which is coupled to the first keyboard unit 3, a pivotal point hole 8 for receiving the pivotal point pin 5 inserted thereinto, and a pivotal point portion 10 having a penetrating pin hole 9 are formed, and a pin hole 11 is formed at a position closer to the first keyboard unit 3 and lower than the pivotal point hole 8. As shown in FIG. 5, key tops 1 are arranged near a joint of both of the first keyboard unit 3 and the second keyboard unit 4, and its arrangement is similar to that of an ordinary keyboard.

The first keyboard unit 3 and the second keyboard unit 4 are foldably coupled by a cover 12 and an end plate 13. As shown in FIG. 5, the cover 12 is composed of a plate portion 14 and side plates 15 provided integrally thereto in front and behind thereof. An inner side of the side plates 15, projections 16 in an extended condition are provided, and pin holes 17 are formed on an opposite side of the projections 16. Moreover, on edges of the side plates 15, notches 18 are provided. One of the notches 18 is designed to be slightly larger than the portion where the pivotal point hole 8 of the second keyboard unit 4, while the other notch 8 is designed to be slightly larger than the pivotal point portion 10 of the second keyboard unit 4.

A plane of the end plate 13 has a rectangular shape, and coupling pins 19 and 20 are projecting outward from the left side and the right side, respectively, of the end plate 13.

The pivotal point pin 5 of the first keyboard unit 3 is inserted into the pivotal point hole 8 of the second keyboard unit 4. The pivotal point portion 6 of the first keyboard unit 3 and the pivotal point portion 10 of the second keyboard unit 4 are aligned so as to be next to each other. A pin (not shown) is inserted from the pivotal point portion 10 toward the pivotal point portion 6, so that the first keyboard unit 3 pivots around the pivotal point pin 5 with respect to the second keyboard unit 4, as shown in FIG. 2.

As shown in arrows in FIG. 5, the projection 16 of the cover 12 is inserted into the guide groove 7 of the first keyboard unit 3. The coupling pin 19 of the end plate 13 is inserted into the pin hole 17 of the cover 12. The coupling pin 20 of the end plate 13 is inserted into the pin hole 11 of the second keyboard unit 4. Thereby, the first keyboard unit 3 and the second keyboard unit 4 are foldably coupled together by the cover 12 and the end plate 13.

Figure 4:
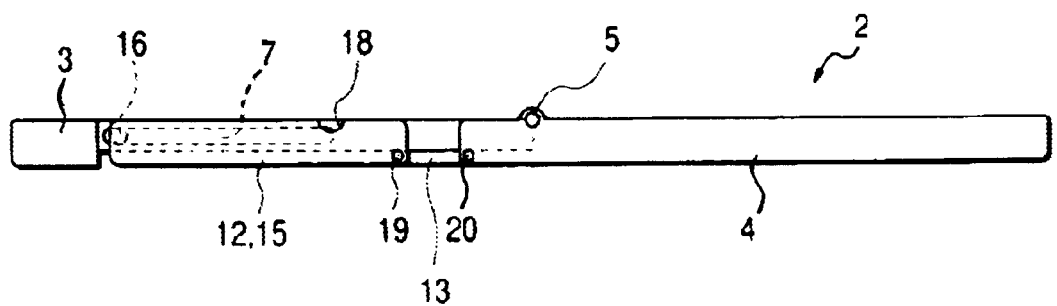
FIG. 4 is a front view illustrating the keyboard input device in an opened state.

As shown in FIG. 4, when the first keyboard unit 3 and the second keyboard unit 4 are in an opened state, the key tops 1 on the first keyboard unit 3 and the key tops 1 on the second keyboard unit 4 are arranged adjacent to each other so as to have a similar keyboard arrangement as an ordinary keyboard input device. While they are at this position, the projection 16 is positioned near extreme left within the guide groove 7.

Figure 2:
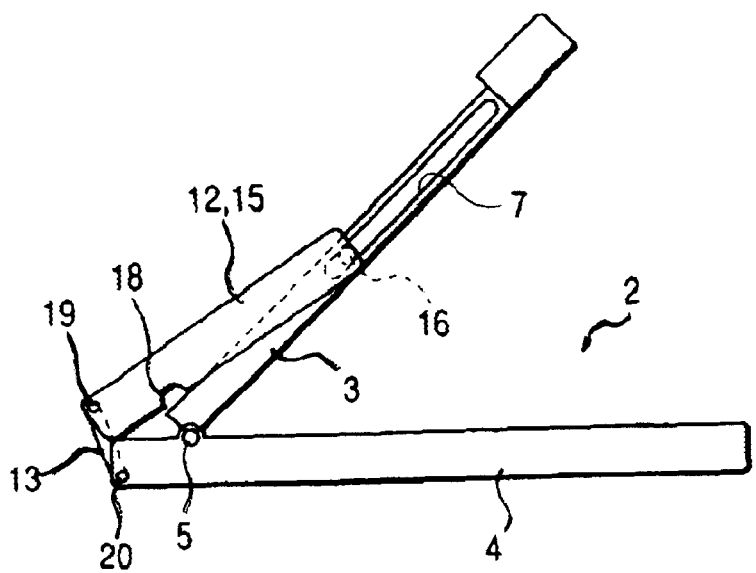
FIG. 2 is a front view illustrating the keyboard input device being opened.
Figure 3:
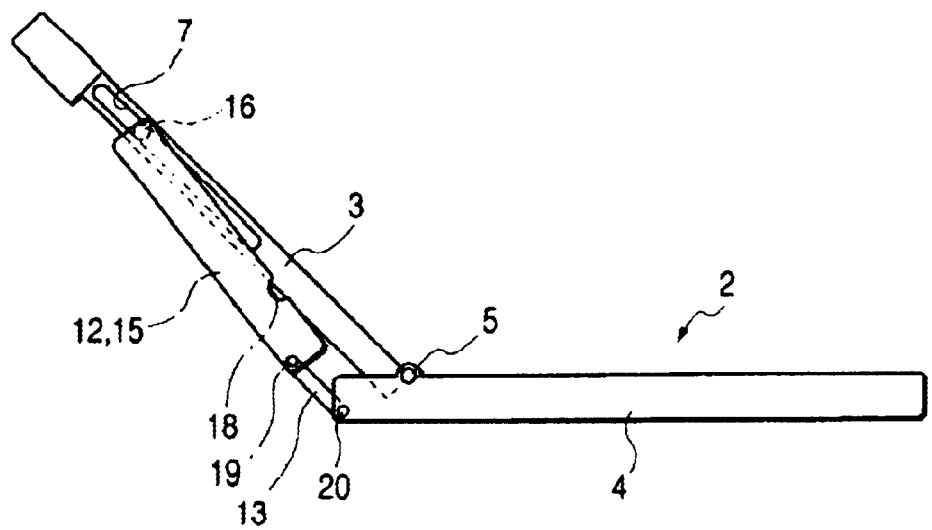
FIG. 3 is a front view illustrating the keyboard input device being opened.

As shown in FIGS. 2 and 3, when the first keyboard unit 3 is raised and further turned toward the second keyboard unit 4 by pivoting about the pivotal point pin 5, the cover 12 and the end plate 13 are interlocked with each other and the projection 16 moves along the guide grove 7.

Figure 1:
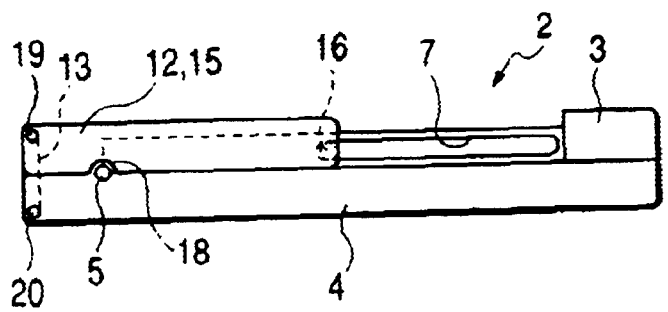
FIG. 1 is a front view of a keyboard input device in a folded state according to a first embodiment of the present invention.

As shown in FIG. 1, when the first keyboard unit 3 superimposes with the second keyboard unit 4, a major portion of the second keyboard unit 4 is covered by the first keyboard unit 3. However, the left portion from the pivotal point pin 5 of the second keyboard unit 4 is not covered by the first keyboard unit 3, but is covered by the cover 12. When in its folded state, side end surface of the joint of the first keyboard unit 3 and the second keyboard unit 4 is covered by the end plate 13.

When the cover 12 superimposes on top of the second keyboard unit 4, the first keyboard unit 3 and the second keyboard unit 4 can be completely folded without the edge of the cover 12 colliding with a portion where the pivotal point hole 8 of the second keyboard unit 4 is formed and the pivotal point portion 10 because the notch 18 is provided on the edge of the cover 12.

As shown in FIG. 5, by providing prism-shaped or cylindrical projections 25 on a top surface of the end on a side of the end plate 13 where the coupling pins 20 are formed, damage of the pivotal point pin 5 can be prevented. If there is no projecting portions 25, the end plate 13 pivots in a folding direction from its vertical position along with pivoting movement of the side plate 15 when the second keyboard unit 4 is folded toward the first keyboard unit 3. Thereby, end of the notch 18 goes in contact with a peripheral portion of the pivotal point hole 8 so that the first keyboard unit 3 is to be folded by pivoting around the contact portion as its axis. Accordingly, there is a possibility of damaging the pivotal point pin 5 of the first keyboard unit 3 due to strain.

By providing the projecting portions 25 on the top surface of the end on the side of the end plate 13 where the coupling pins 20 are formed, when the first keyboard unit 3 is folded toward the second keyboard unit 4, sides of the projecting portions 25 become in contact with a top surface 4a of the second keyboard unit 4 as the end plate 13 becomes its vertical position so as to act as a stopper for preventing the end plate 13 from pivoting further. Thus, the end of the notch 18 is not caught on the peripheral portion of the pivotal point hole 8. Consequently, the pivotal point pin 5 of the first keyboard unit 3 is not subjected to any strains, thus serving to prevent damages.

Figure 6:
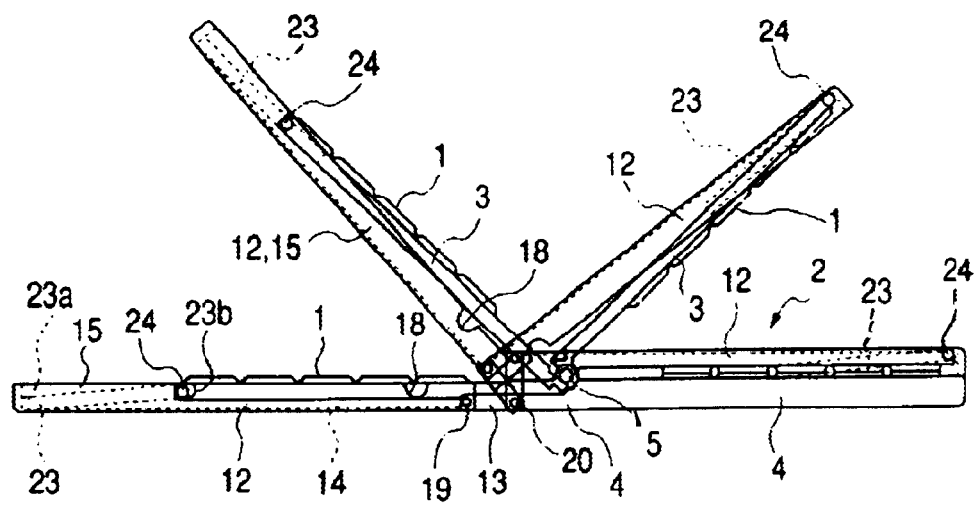
FIG. 6 is a front view illustrating how a keyboard input device according to a second embodiment of the present invention is operated from its closed state to its opened state.
Figure 7:
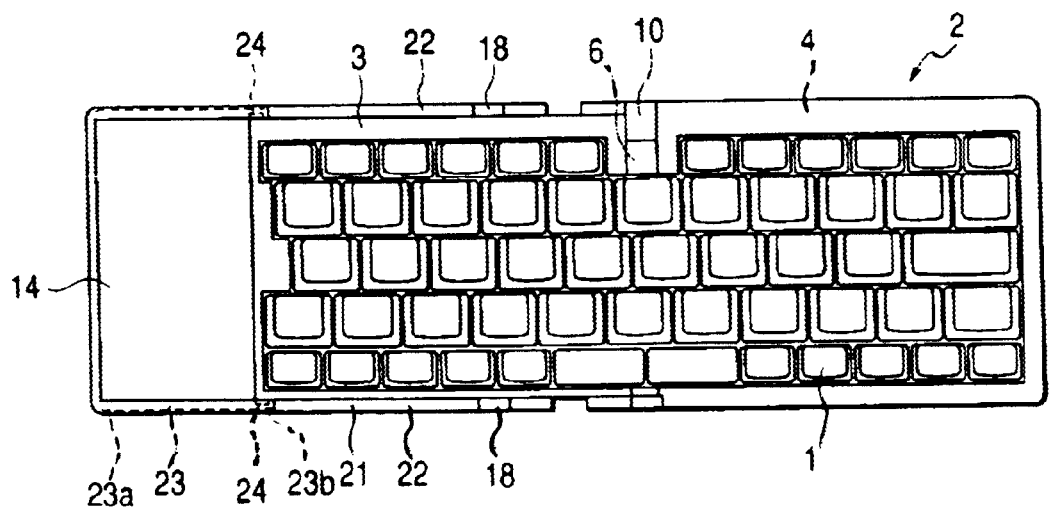
FIG. 7 is a plan view illustrating the keyboard input device in its opened state.
Figure 8:
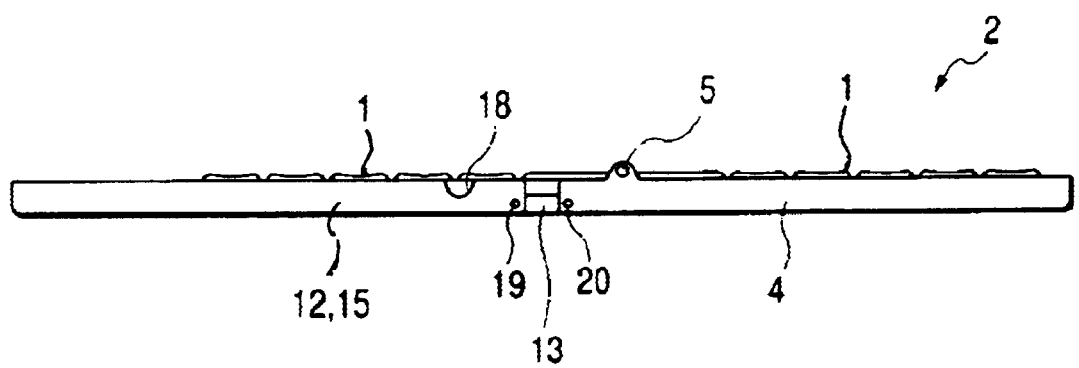
FIG. 8 is a front view illustrating the keyboard input device in its opened state.
Figure 9:
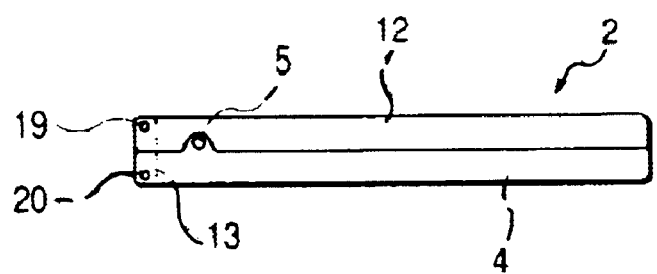
FIG. 9 is a front view illustrating the keyboard input device in its closed state.

FIGS. 6 to 9 are drawings illustrating a second embodiment of the present invention. FIG. 6 is a front view showing how a keyboard input device is operated from its closed state to opened state. FIG. 7 is a plan view of a keyboard input device showing its opened state. FIG. 8 is a front view of a keyboard input device in its opened state. FIG. 9 is a front view of a keyboard input device in its closed state.

In the present embodiment, the following aspects are different from the previously described first embodiment. A first keyboard unit 3 is housed within a bottomed cover 12. Specifically, the cover 12 serves as a casing for the first keyboard unit 3, and a guide groove 23 is formed on an inner surface of both side plates 15 of the cover 12. As shown in FIG. 6, the guide groove 23 is inclined so that an outer side end 23a and an inner side end 23b are in a lower position and an upper position, respectively, the outer side end 23a and the inner side end 23b having some horizontal portions.

On the outer side end of the first keyboard unit 3 has a projection 24 projecting therefrom so as to be inserted slidably into the guide groove 23 of the cover 12.

As shown in FIG. 6, when the first keyboard unit 3 and the second keyboard unit 4 are in an opened state, the projection 24 of the first keyboard unit 3 is placed near the inner side end 23b of the guide groove 23. Accordingly, the first keyboard unit 3 is in a state of being lifted up. Thus, as shown in FIG. 8, a top surface of key tops 1 is protruded from a top surface of the cover 12, thus obtaining desirable key operability.

When the first keyboard unit 3 is raised and turned further toward the second keyboard unit 4 by pivoting about the pivotal point pin 5, the cover 12 and the end plate 13 are interlocked with each other so that the projection 24 moves from the inner side end 23b toward the outer side end 23a along the guide groove 23. As the projection 24 moves, the first keyboard unit 3 is held in the cover 12 and the first keyboard unit 3 superimposes on top of the second keyboard unit 4.

At that time, a major portion of the second keyboard unit 4 is covered by the first keyboard unit 3, and the left side from the pivotal point pin 5 of the second keyboard unit 4 is covered by the cover 12. Moreover, end surfaces of the first keyboard unit 3 and the second keyboard unit 4 are covered by the end plate 13 as in the first embodiment described previously.

Figure 10:
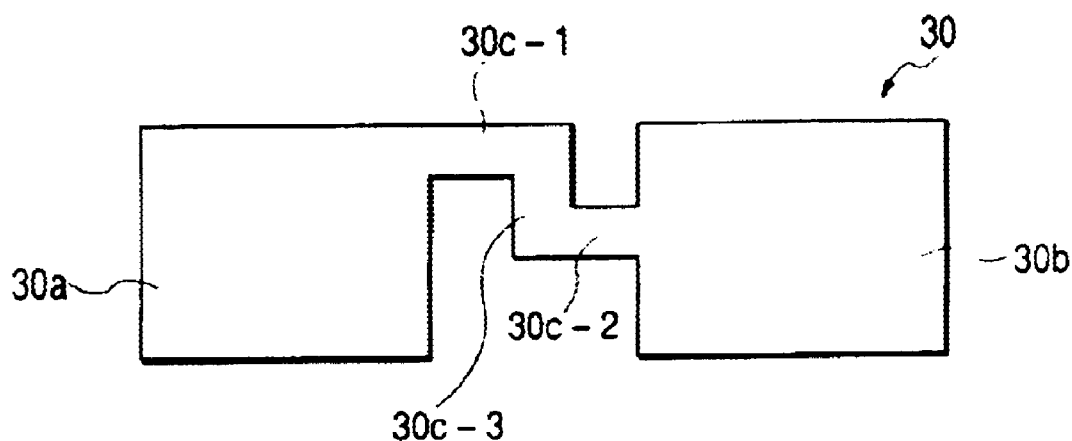
FIG. 10 is a plan view before a membrane switch considered previously is integrated.
Figure 11:
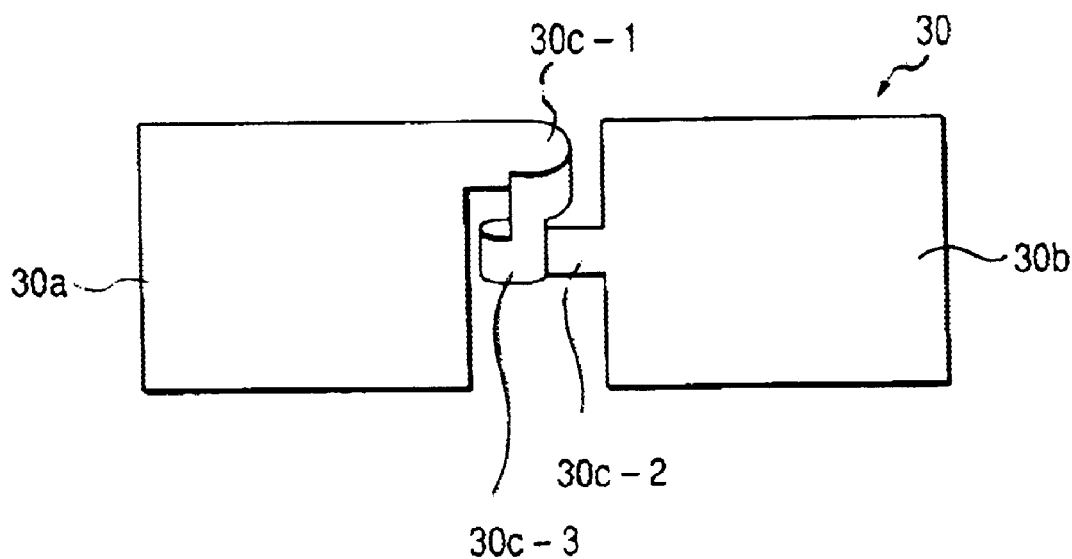
FIG. 11 is a plan view illustrating the membrane switch being integrated.
Figure 12:
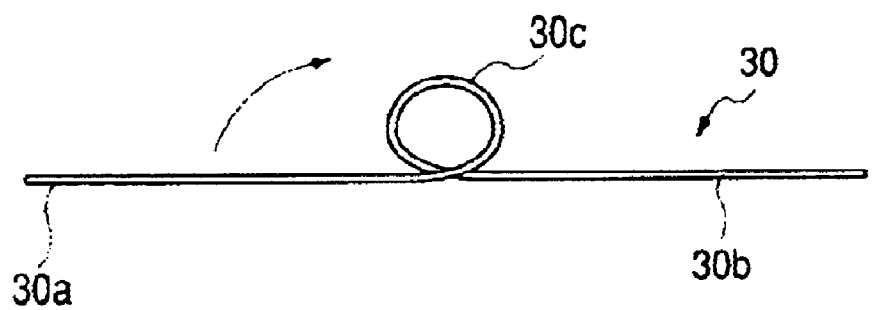
FIG. 12 is a front view of a membrane switch when a first keyboard unit and a second keyboard unit are in an opened state.
Figure 13:
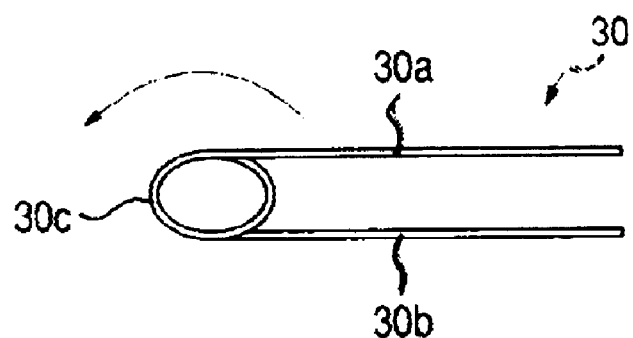
FIG. 13 is a front view of a membrane switch when a first keyboard unit and a second keyboard unit are in a folded state.
Figure 14:
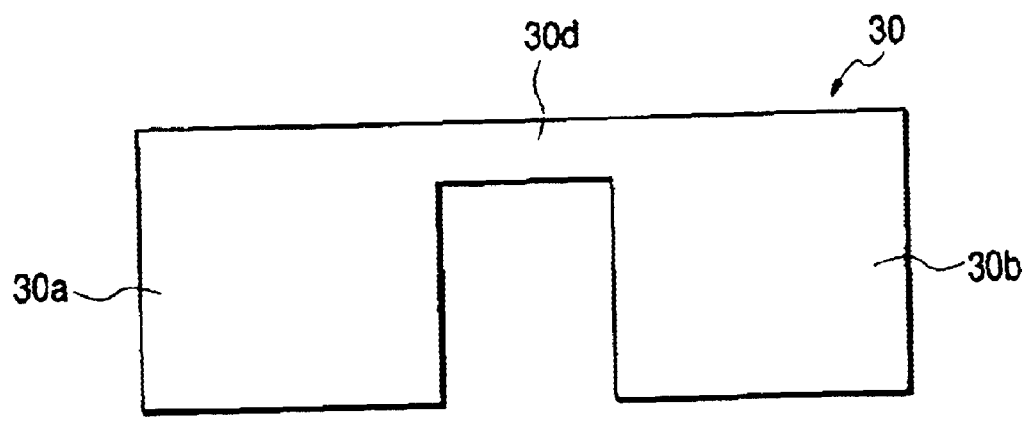
FIG. 14 is a plan view of a membrane switch according to a third embodiment of the present invention before it is integrated.
Figure 15:
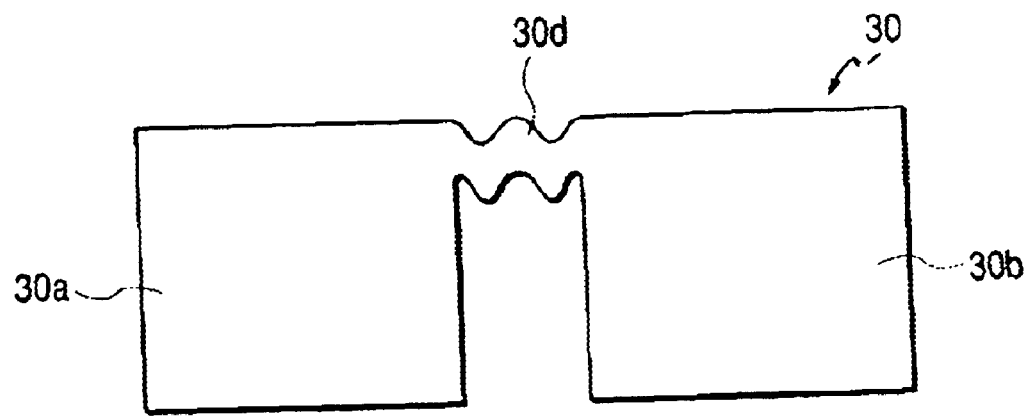
FIG. 15 is a plan view of the membrane switch being integrated.
Figure 16:
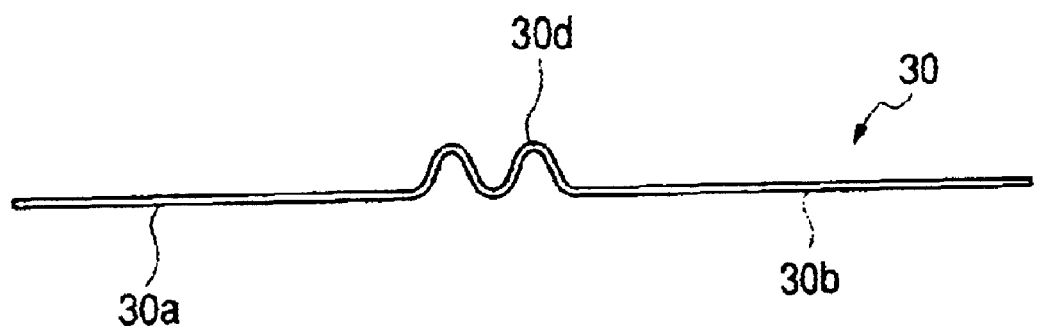
FIG. 16 is a front view of a membrane switch when a first keyboard unit and a second keyboard unit are in an opened state.
Figure 17:
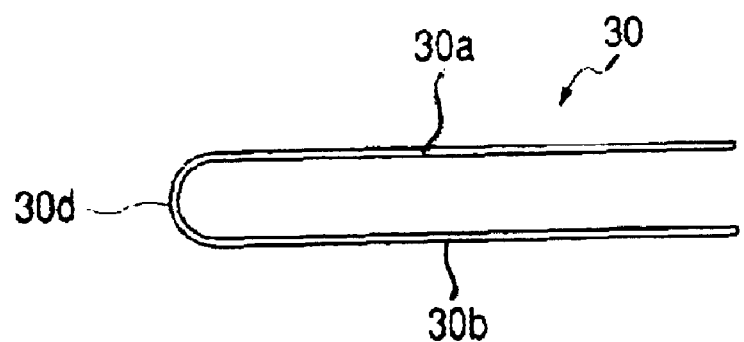
FIG. 17 is a front view of a membrane switch when a first keyboard unit and a second keyboard unit are in a folded state.
Figure 18:
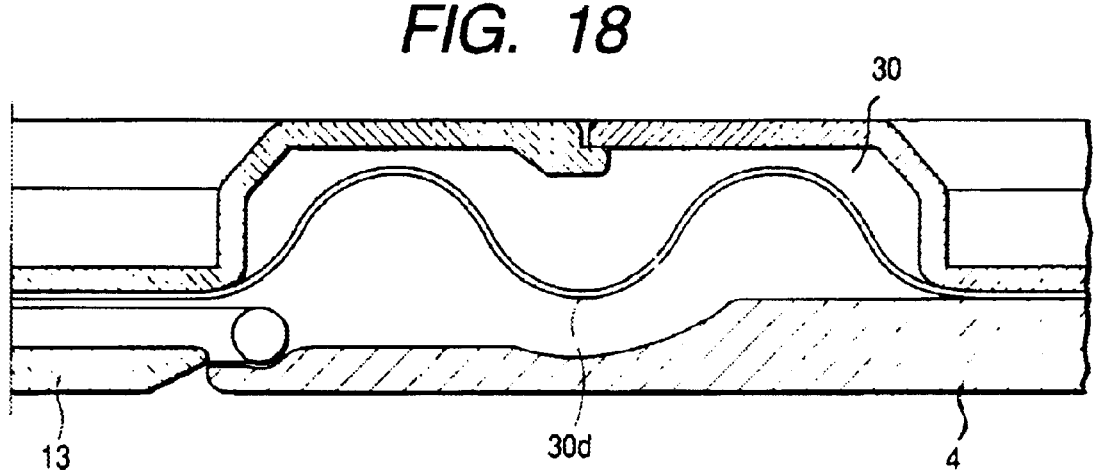
FIG. 18 is a partially enlarged cross-sectional view of a keyboard input device when a first keyboard unit and a second keyboard unit are in an opened state.
Figure 19:
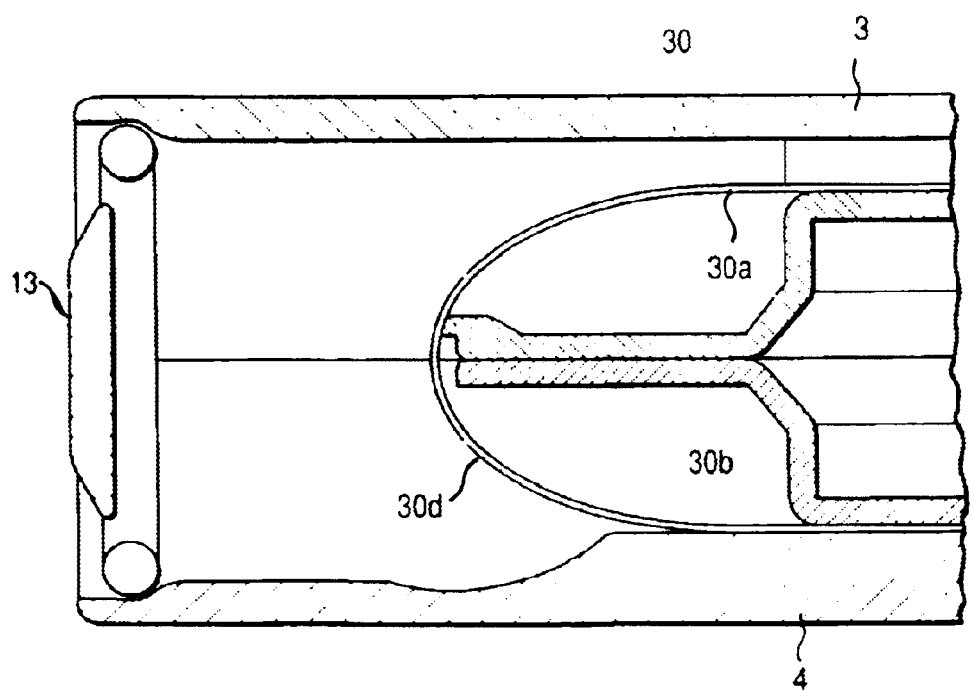
FIG. 19 is a partially enlarged cross-sectional view of a keyboard input device when a first keyboard unit and a second keyboard unit are in a folded state.

FIGS. 10 to 19 are diagrams showing a third embodiment of the present invention, in which, FIG. 10 is a plan view illustrating a membrane switch as considered previously before being integrated; FIG. 11 is a plan view of the membrane switch at a time of integration; FIG. 12 is a front view of a membrane switch when a first keyboard unit and a second keyboard unit are in an opened state; and FIG. 13 is a front view of a membrane switch when a first keyboard unit and a second keyboard unit are in a folded state. Moreover, FIG. 14 is a plan view of a membrane switch according to a third embodiment before being integrated; FIG. 15 is a plan view of the membrane switch at the time of integration; FIG. 16 is a front view of the membrane switch when the first keyboard unit and the second keyboard unit are in an opened state; FIG. 17 is a front view of the membrane switch when the first keyboard unit and the second keyboard unit are in a folded state; FIG. 18 is a partially enlarged cross-sectional view of a keyboard input device with the first keyboard unit and the second keyboard unit in an opened state; and FIG. 19 is a partially enlarged cross-sectional view of the keyboard input device with the first keyboard unit and the second keyboard unit in a folded state.

Inside a keyboard unit 2, a sheet-like membrane switch 30 having a plurality of switching elements (not shown) corresponding to each key top 1 is housed therewithin. The inventors of the present invention studied the membrane switch 30 as shown in FIGS. 10 to 13. The membrane switch 30 has a first keyboard unit membrane switch 30a and a second keyboard unit membrane switch 30b, each coupled together by a coupling part 30c. The coupling part 30c, as shown in FIG. 10, is composed of an upper side coupling part 30c-1 extending horizontally from an end of the membrane switch 30a, a lower coupling part 30c-2 extending horizontally from an end of the membrane switch 30b, and a middle coupling part 30c-3 connecting between the upper coupling part 30c-1 and the lower coupling part 30c-2. The coupling part 30c has a plurality of bending portions and a complicated structure.

When the membrane switch 30 is to be integrated to the keyboard unit 2, as shown in FIG. 11, the coupling part 30 is rotated to form a ring with which the membrane switch 30 is integrated into the keyboard unit 2. When opening or closing the keyboard unit 2, the membrane switch 30a and the membrane switch 30b pivot relative to each other about the ring-shaped coupling part 30 as shown in FIGS. 12 and 13.

With the use of the membrane switch 30, it is necessary to provide a space for housing the ring-shape coupling part 30 inside the keyboard unit 2. Thus, it may become an obstacle to achieve a smaller and thinner keyboard input device, and causes less flexibility to a parts layout. In addition, when the membrane switch 30 is integrated, it is necessary to rotate the narrow coupling part 30 having a complex structure. Accordingly, there is a possibility of damaging the coupling part 30 when folding, and the folding procedure becomes complicated, thus deteriorating operation efficiency.

In order to solve the above-described problems, in the present embodiment, as shown in FIG. 14, a first keyboard unit membrane switch 30a and a second keyboard unit membrane switch 30b are coupled with a coupling part 30d extending linearly. When the membrane switch 30 is to be integrated into the keyboard unit 2, the coupling part 30d is bent to have a wave shape by slightly narrowing it. Then, with the bent state of the coupling part 30d, it is integrated into the keyboard unit 2.

When the first keyboard unit 3 and the second keyboard unit 4 are horizontally opened as shown in FIG. 18, the coupling part 30d of the membrane switch 30 is bent in the wave shape. When the first keyboard unit 3 and the second keyboard unit 4 are folded as shown in FIG. 19, the coupling part 30d extends so as to bend into a U-shape.

By using the membrane switch 30 of the present embodiment, integration thereof becomes easy, and there is no damage to the coupling part 30d. Accordingly, the housing space can be narrow, thus allowing for a smaller and thinner keyboard input device.

Figure 20:
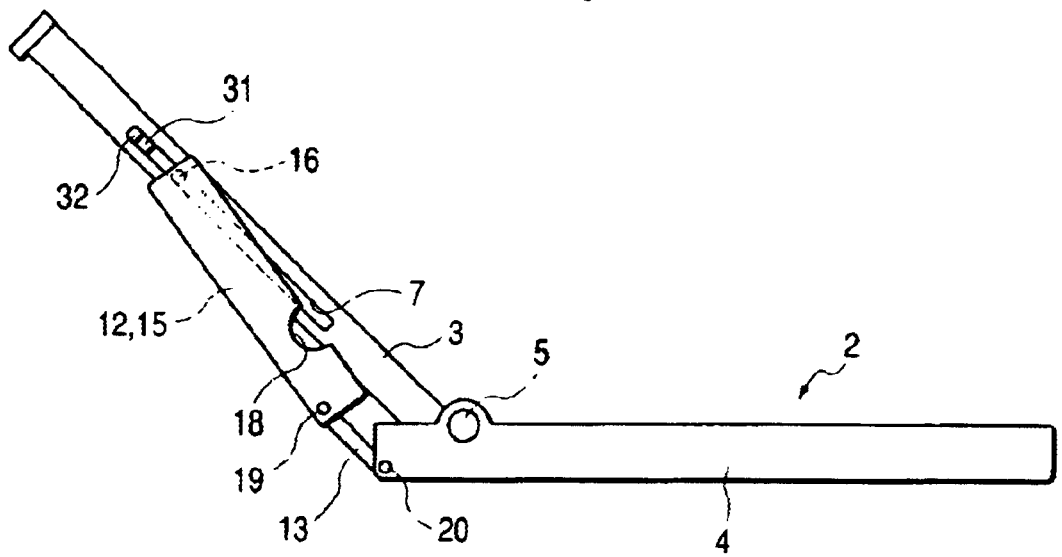
FIG. 20 is a front view illustrating a keyboard input device according to a fourth embodiment of the present invention being opened.
Figure 21:
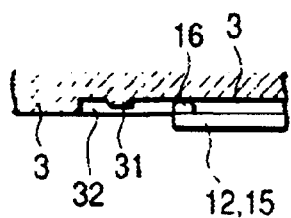
FIG. 21 is a partially broken view of the keyboard input device.

FIGS. 20 and 21 are diagrams illustrating a fourth embodiment of the present invention, in which, FIG. 20 is a front view of a keyboard input device according to the present embodiment being opened; and FIG. 21 is a partial cross-sectional view of the keyboard input device.

The fourth embodiment is different from the first embodiment in that an angled convex portion 31 and a projection housing 32 are provided next to each other near an end, opposite of the pivotal point pin 5, of the guide grove 7 formed in the first keyboard unit 3. When the keyboard input device is opened for use, the projection 16 provided on the cover 12 moves along the guide groove 7. Immediately before the keyboard input device is fully opened, the projection 16 elastically overrides the convex portion 31. Then, as the keyboard input device is fully opened, the projection 16 is elastically fitted into the projection housing 32. When the keyboard input device is to be closed, the above events occur in the opposite sequence.

Figure 22:
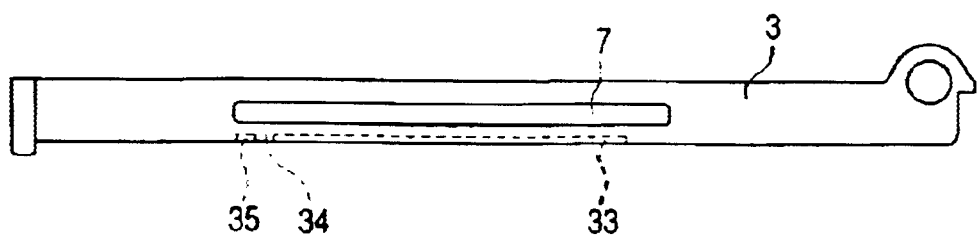
FIG. 22 is a side view of a first keyboard unit according to a fifth embodiment of the present invention.
Figure 23:
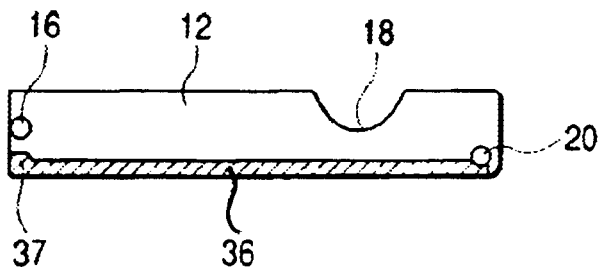
FIG. 23 is a cross-sectional view of a cover.

FIGS. 22 and 23 are diagrams showing a fifth embodiment of the present invention, in which FIG. 22 is a side view of a first keyboard unit according to the present embodiment, and FIG. 23 is a cross-sectional view of a cover.

What is different from the above-mentioned fourth embodiment is that, as shown in FIG. 22, a lower surface (a center portion of the lower surface, for example) of the first keyboard unit 3 is provided with a guide groove 33 formed thereon, the guide grove 33 being different from the above-described guide groove 7 and extending parallel to the guide groove 7, and an angled convex portion 34 and a projection housing 35 are provided next to each other near one of ends of the guide groove 33. Near one of ends of a bottom wall 36 of a cover 12, a projection 37 is formed.

When the first keyboard unit 3 and the cover 12 are combined, the projection 37 of the cover 12 is slidably inserted into the guide grove 33 of the first keyboard unit 3. When the keyboard input device is opened, the projection 37 of the cover 12 moves along the guide groove 33, and immediately before the keyboard input device is fully opened, the projection 37 elastically overrides the convex portion 34. Then, as the keyboard input device is fully opened, the projection 37 is elastically fitted into the projection housing 35. When the keyboard input device is to be closed, the above events occur in a reverse sequence.

Figure 24:
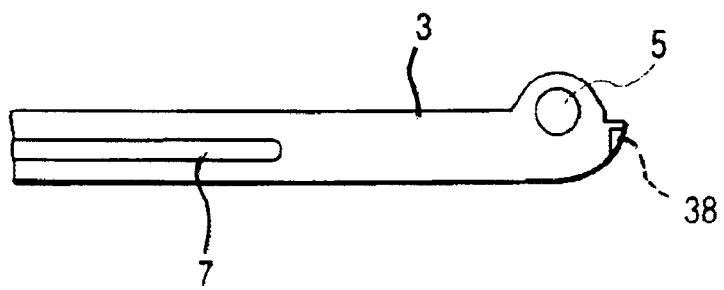
FIG. 24 is a partial side view of a first keyboard unit according to a sixth embodiment of the present invention.
Figure 25:
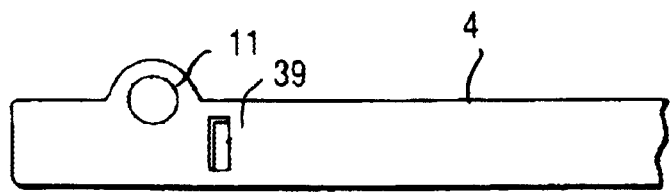
FIG. 25 is a partial side view illustrating inside of a second keyboard unit.

FIGS. 24 and 25 are diagrams showing a sixth embodiment of the present invention, in which, FIG. 24 is a partial side view of a first keyboard unit according to the present invention, and FIG. 25 is a partial side view of an inner side of a second keyboard unit.

By inserting the pivotal point pin 5 of the first keyboard unit 3 into the pin hole 11 of the second keyboard unit 4, the first keyboard unit 3 and the second keyboard unit 4 are pivotably coupled with each other. As shown in FIG. 24, a groove (concave portion) 38 is formed adjacent to the pivotal point pin 5 of the first keyboard unit 3, and as shown in FIG. 25, a fitting convex portion 39 is provided adjacent to the pin hole 11 of the second keyboard unit 4.

When the first keyboard 3 and the second keyboard 4 are folded, the groove 38 and the fitting convex portion 39 are separated. By opening the keyboard input device, the groove 38 and the fitting convex portion 39 move closer to one another. By opening further, the groove 38 overrides the fitting convex portion 39, and when the first keyboard unit 3 and the second keyboard unit 4 becomes in their horizontal state, the groove 38 is elastically fitted into the fitting convex portion 39. When the keyboard input device is to be closed, the above events occur in a reverse sequence.

In the present embodiment, the groove (concave portion) 38 is formed on the first keyboard unit 3, and the fitting convex portion 39 is provided to the second keyboard unit 4. Alternatively, the fitting convex portion 39 may be provided to the first keyboard unit 3 while the groove (concave portion) 38 is formed on the second keyboard unit 4.

By providing structures as in the fourth to sixth embodiments, when the keyboard input device is opened, it has a desirable feel due to a tactile feedback. Moreover, it is possible to maintain the keyboard input device in its fully-opened state, thus improving the key operability.

In the fourth to sixth embodiments, the tactile feedback is given when the keyboard input device is opened. Alternatively, it may have a structure in which the tactile feedback may be given when the keyboard input device is closed, or when the keyboard input device is opened and closed.

Figure 26:
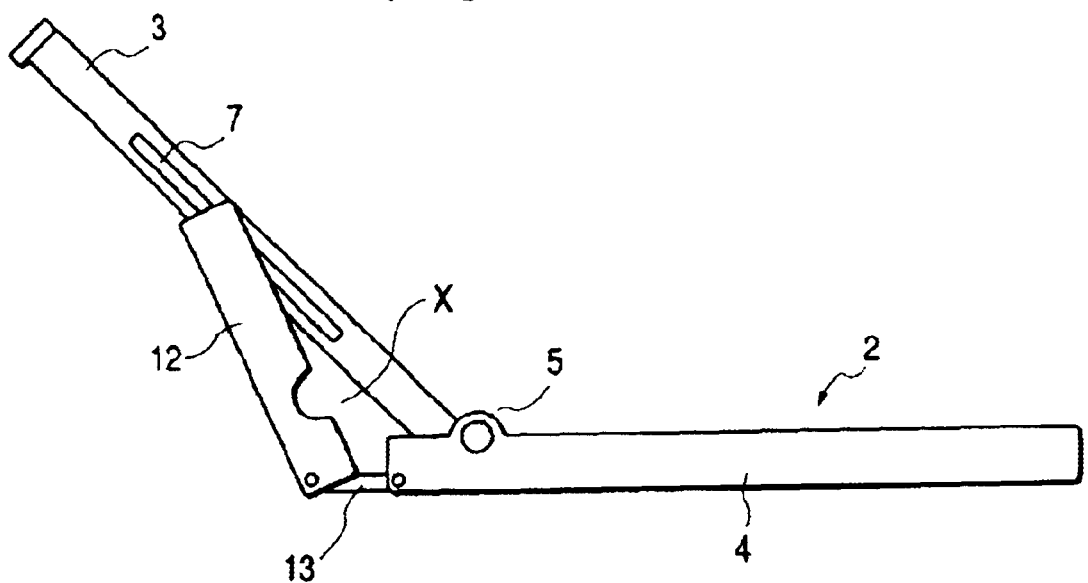
FIG. 26 is a front view of a keyboard input device considered previously.
Figure 27:
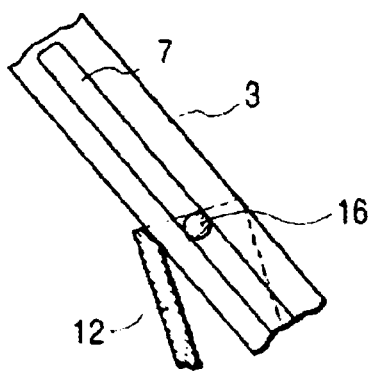
FIG. 27 is a diagram of a keyboard input device, partially showing a cross section thereof.
Figure 28:
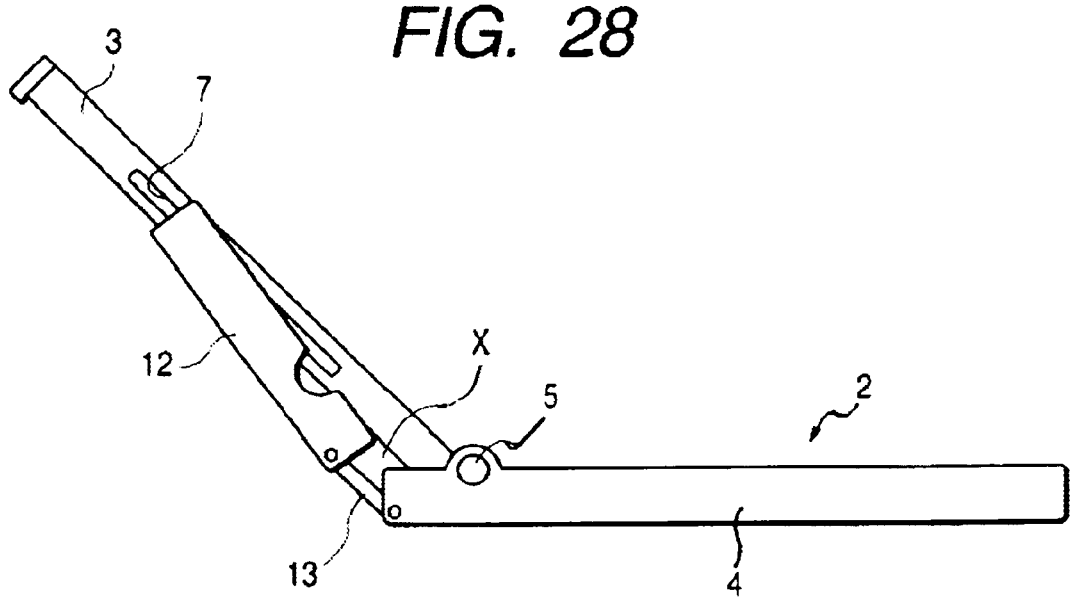
FIG. 28 is a front view a keyboard input device according to a seventh embodiment of the present invention.
Figure 29:
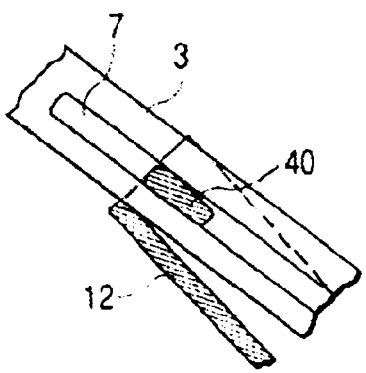
FIG. 29 is a diagram of a keyboard input device, partially showing a cross section thereof.

FIGS. 26 to 29 are diagrams illustrating a seventh embodiment of the present invention. FIG. 26 is a front view of a keyboard input device which is studied previously, and FIG. 27 is a diagram of the keyboard input device, partially showing cross section thereof. FIG. 28 is a front view of a keyboard input device according to the present embodiment, and FIG. 29 is a diagram of the keyboard input device, partially showing a cross section thereof.

A keyboard input device that the present inventors have studied previously, the projection 16 of the cover 12 is inserted into the guide groove 7 of the first keyboard unit 3, as described above, and the projection 16 moves along the guide groove 7 as the first keyboard unit 3 pivots.

Now, the projection 16 is a round pin as shown in FIG. 27, and thus, the projection 16 comes in contact linearly with respect to an inner wall of the guide groove 7. Accordingly, when the firs keyboard unit 3 is inclined, the cover 12 is hung from the first keyboard unit 3 due to the weight of the cover 12 and the end plate 13. Thus, as shown in FIG. 26, a gap X formed between the first keyboard unit 3 and the cover 12 and the end plate 13 becomes large. Consequently, during opening or closing operation of the first keyboard unit 3, the operator's fingers or other foreign materials such as office supplies may be caught in the gap X.

In order to solve such a problem, as shown in FIG. 29, a projection 40 with an angle controller is provided to the cover 12, the projection 40 having a cross-section in a shape of a narrow general trapezoid, oval figure, or triangle.

Figure 30:
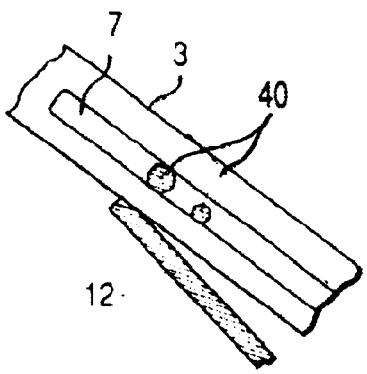
FIG. 30 is a diagram of a keyboard input device according to an eighth embodiment of the present invention, partially showing cross section thereof.
Figure 31:
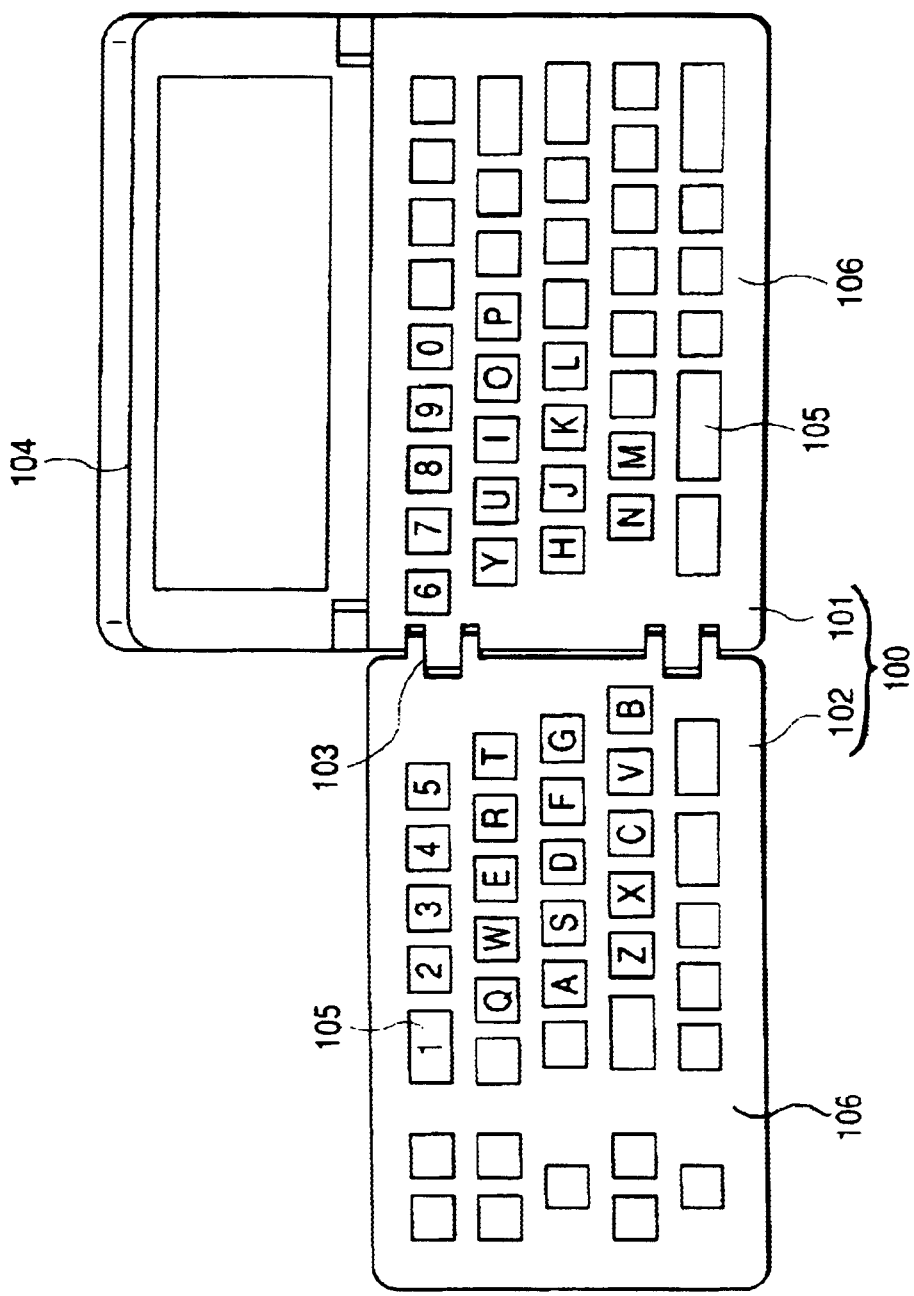
FIG. 31 is a plan view of a keyboard input device proposed in prior art.

FIG. 30 is a diagram illustrating an eighth embodiment of the present invention, which illustrate a keyboard input device being partially cross-sectioned. In the case of the present embodiment, along a longitudinal direction of the cover 12, a plurality (two, for example) of pins or convex portions are provided so as to arrange the projection 40 with the angle controller.

By providing the projection 40 with the angle controller as in the seventh and eighth embodiments, during the opening and/or closing operation of the first keyboard unit 3, a side surface of the projection 40 or two portions thereof come in contact with the inner wall of the guide groove 7, and an angle of the cover 12 with respect to the first keyboard unit 3 is regulated. Accordingly, as shown in FIG. 28, a shape of the cover 12 generally in line with the first keyboard unit 3, thus reducing the gap X formed between the first keyboard unit 3 and the cover 12 and the end plate 13. Thus, it is possible to eliminate a concern about fingers or other foreign materials being caught in the gap. It should be understood that a shape and a size of the projection 40 with the angle controller should be set so as not to interfere with the opening/closing operation of the first keyboard unit 3.

According to the first invention, as described above, a first keyboard unit is pivotably supported by a second keyboard unit so as to pivot about a pivotal point at a position slightly inside an end on a side where the first keyboard unit and the second keyboard unit are coupled with each other. Accordingly, unlike a conventional technique, a key arrangement on the first keyboard unit and a key arrangement on the second keyboard unit do not have to be separated, and thus similarly to an ordinary keyboard, there is no uncomfortable feeling when the keyboard is used.

When the first keyboard unit and the second keyboard unit are superimposed, an area between the end on the coupling side and the pivotal point of the second keyboard unit is covered by a cover while the first keyboard unit and the end of the coupling side of the second keyboard unit are covered by a end plate. Thus, it is possible to securely protect key tops when folding.

According to the second invention, as described above, at least one of a first keyboard unit side and a second keyboard unit side is movable relative to a casing. Therefore, when the keyboard unit is opened, key tops provided on the keyboard unit protrudes from the casing, and when the keyboard unit is closed, the key tops provided on the keyboard unit is housed within the casing. Because the key tops projects from the casing at a time of key entries, operability of the keys is not impaired. Moreover, when the keyboard unit is folded, the top surface of the key tops is lowered, thus preventing any interference for the folding operation.

According to the third invention, as described above, when a first keyboard unit and a second keyboard unit are in a horizontal state, a coupling of a membrane switch is bent in a wave shape, while when the first keyboard unit and the second keyboard unit are folded, the coupling is bent in a U-shape. Thus, integration of the membrane switch is easy without damaging the coupling. Moreover, the housing space can be small, thus allowing a smaller and thinner keyboard input device.

According to the fourth invention, as described above, inside a guide groove of a first keyboard unit is provided with a convex portion overriding a projection of a cover immediately before a first keyboard unit and a second keyboard unit move into in the horizontal state, and a projection housing for receiving the projection fitted thereinto when the first keyboard unit and the second keyboard unit are in the horizontal state.

According to the fifth invention, as described above, adjacent to a coupling of the first keyboard unit to the second keyboard unit, a convex or concave portion is provided. Likewise, adjacent to a coupling of the second keyboard unit to the first keyboard unit, a concave or convex portion is provided. Immediately before the first keyboard unit and the second keyboard unit move into in a horizontal state, the concave portion overrides the convex portion, and the first keyboard unit and the second keyboard unit are in the horizontal state, the concave portion and the convex portion are fitted together.

According to the fourth and fifth invention, when the keyboard input device is opened, there is a desirable feel due to a tactile feedback. Moreover, it is possible to hold the keyboard input device in its fully-opened state, thus improving operability of the key.

According to the sixth invention, by inserting a projection provided on a cover into a guide groove formed in a first keyboard unit, the cover is slidably supported by the first keyboard unit, the projection having an angle controller for controlling an angle of the cover with respect to the first keyboard unit. Accordingly, a gap formed between the first keyboard unit 3 and the cover 12 becomes small, thus eliminating a problem of fingers or other foreign materials being caught therein.

What is claimed is:

1. A keyboard input device of a folding type having a keyboard unit divided into a first keyboard unit and a second keyboard unit, wherein at least one of the first keyboard unit and the second keyboard unit is movable relative to a casing, and the first keyboard unit is pivotably supported by the second keyboard unit so as to pivot about a position slightly inside from an end of a coupling side of the second keyboard unit as its axis, wherein key tops provided to the keyboard unit are projected from the casing when the keyboard unit is opened, and the key tops provided to the keyboard unit are housed in the casing when the keyboard unit is closed, wherein a cover for covering an area from the end of the coupling side of the second keyboard unit to the axis when the first keyboard unit and the second keyboard unit are superimposed is slidably attached to the first keyboard unit, wherein an end plate for covering the end of the coupling side of the second keyboard unit and the first keyboard unit when the first keyboard unit and the second keyboard unit are superimposed is pivotably coupled between the cover and the second keyboard unit, wherein a convex portion is provided adjacent to a coupling of the first keyboard unit to the second keyboard unit while a concave portion is provided adjacent to a coupling of the second keyboard unit to the first keyboard unit, and wherein the concave portion overrides the convex portion immediately before the first keyboard unit and the second keyboard unit move into a horizontal state, and the concave portion and the convex portion are fitted together when the first keyboard unit and the second keyboard unit are in a horizontal state.

2. A keyboard input device according to claim 1, wherein a projection provided to the cover is inserted into a guide groove formed to the first keyboard unit, and wherein a convex portion overriding the projection immediately before the first keyboard unit and the second keyboard unit move into a horizontal state and a projection housing where the projection fits into when the first keyboard unit and the second keyboard unit are in a horizontal state is provided next to each other along the guide groove.

3. A keyboard input device according to claim 1, wherein the cover is pivotably supported by the first keyboard unit by inserting a projection provided to the cover into a guide groove formed to the first keyboard unit, and wherein the projection has an angle controller for controlling an angle of the cover with respect to the first keyboard unit.

* * * * *